United States Patent Office 3,160,654
Patented Dec. 8, 1964

3,160,654
METHOD OF MAKING CARBOXYLIC ESTERS OF NITROALCOHOLS
James C. Conly, East Paterson, N.J., assignor to United States Rubber Company, New York, N.Y., a corporation of New Jersey
No Drawing. Filed Jan. 4, 1954, Ser. No. 402,185
13 Claims. (Cl. 260—471)

This invention relates to a new method of making carboxylic esters of alcohols having the structure $$A-C(NO_2)_2-CH_2OH$$

wherein A is a hydrogen, methyl or nitro group.

These esters are useful as explosives, propellants and propellant plasticizers.

Heretofore, much has been devoted to attempts to make these esters by a cheap and efficient method, but without success. They can be made only very slowly and in low yield, if at all, by the conventional method used to effect esterification by the reaction between an alcohol and an organic acid in a solvent such as benzene in the presence of a small amount of a strong acid catalyst. Consequently, these esters have been made by prior workers from an alcohol and an acyl chloride in the presence of aluminum chloride. Obviously, the acyl chloride must be made by a time-consuming and expensive operation from the corresponding acid. Also, hydrogen chloride fumes are given off in large volume during the esterification. Commercially, this gas must be caught and disposed of, thus further adding to the complexity and expense of the reaction.

I have now found that these esters can be easily made directly from the desired carboxylic acid, or a substantially equivalent derivative thereof, as disclosed hereinafter, and alcohol in extremely high, often quantitative, yield by carrying out the reaction in highly concentrated sulfuric acid. This acid acts in a dual capacity, namely, both as a solvent medium for the reagents and to tie up the water or other by-products liberated by the esterification, thereby displacing the equilibrium in the direction of esterification.

My reaction can be carried out merely by mixing the two reagents in the sulfuric acid, and letting the mixture stand for several hours at room temperature. However, to hasten the reaction I often heat the mixture gently at a temperature up to about 100° C., preferably at about 40-75° C.

The reaction time will, of course, vary widely depending upon the many variable factors, e.g., temperature, sulfuric acid concentration and amount, etc. Usually times of the order of 1 to 24 hours are sufficient, the longer times being used at lower temperatures as will be obvious to skilled chemists.

The esters usually are only slightly soluble in the sulfuric acid at room temperature, but are considerably more soluble at elevated temperature. This solubility change can be used in separating the esters from the original solution, or in recrystallizing the esters from sulfuric acid. Normally, if they crystallize from the original solution they do so in very pure form.

Optionally, the esters also can be separated from the reaction medium by extraction with a liquid which dissolves the esters but is substantially immiscible with sulfuric acid. Examples of such liquids are chloroform and carbon tetrachloride.

A third method of separating the esters from the reaction mixture is by pouring it into cold water. Because the large amount of heat of dilution of the strong sulfuric acid must be dissipated I prefer to pour the reaction mixture onto ice, customarily with stirring. This method of separating the esters is somewhat less preferable because water-insoluble impurities may be present in small amount and will contaminate the product, although by simple recrystallization, e.g., from methanol, such impurities can be removed easily. Another objection to this method of separating the esters, when operating on a commercial scale, is that the sulfuric acid is so diluted that it cannot be re-used in my process.

The initial concentration of the sulfuric acid can be varied between a minimum of about 96% $H_2SO_4$, the rest being water, and a maximum of 130%, the 30% above 100% $H_2SO_4$ being sulfur trioxide, all percentages being by weight. The esterification does not proceed to a practical extent in sulfuric acid which is less concentrated than about 96%. Oleum of more than about 130% concentration attacks the reagents and/or the esters themselves, thereby causing severe losses of the esters. It will be understood that whenever a concentration of sulfuric acid below 100% is specified, the difference between the figure given and 100% represents water; and whenever a concentration above 100% is specified, the difference between 100% and the figure given represents sulfur trioxide.

Preferably, I use sulfuric acid whose initial concentration is between 100% and 120%. In such a medium the esterification is rapid, and the yield of the desired ester is high.

The concentration of the reagents in the sulfuric acid can be varied widely. However, I prefer to use enough sulfuric acid to dissolve a major proportion of the reagents. As the solubility varies depending on the specific reagents, on the concentration of the sulfuric acid with respect to water or sulfur trioxide, and on the reaction temperature, no precise limits can be set. However, in any particular reaction system the preferred conditions can be found easily by simple experimentation. The following reference points may be of interest. A minimum of about two parts, by weight, of 100% sulfuric acid is needed per part of an equimolar mixture of 2,2,2-trinitroethanol and 4,4,4-trinitrobutyric acid in order to carry out the esterification conveniently at room temperature. When the same esterification is carried out in 96% sulfuric acid at least 2.5 parts are needed to attain the same fluidity. In general, it can be said that as the initial concentration of the sulfuric acid is increased, with respect to sulfur trioxide, the less sulfuric acid is needed as a solvent for the esterification. Also, if the temperature of the esterification is increased the amount of sulfuric acid of a particular concentration usually can be decreased somewhat.

There is no critical maximum amount of sulfuric acid. Of course, for economy the amount will usually be kept reasonably close to the minimum which can conveniently be used in the esterification.

Sulfuric acid of 100%, or lower, i.e., as low as 96%, initial concentration can be used in my invention. Such acid presumably ties up the water of esterification by reason of the known great affinity of highly concentrated sulfuric acid for water, as illustrated by the enormous amount of heat evolved upon dilution of concentrated sulfuric acid with water. However, I prefer to use still more concentrated sulfuric acid because the sulfur trioxide present in its reacts irreversibly with water formed during esterification, thereby aiding completion of the reaction. For maximum yield of product and speed of reaction I prefer to use a sufficient amount of sulfur trioxide in the sulfuric acid to react chemically with all of the water formed in the esterification. By this means I often obtain an almost quantitative yield of many of the esters.

An additional function of the sulfur trioxide is to react with any water which may be present, as an impurity, with any of the reagents. For example, technical grade 2,2,2-trinitroethanol normally contains about 20% of water which is rather difficult to remove because pure trinitroethanol is very hygroscopic. Furthermore, dry trinitroethanol is quite sensitive to mechanical shock. Dilution with 20% of water reduces the sensitivity of the trinitroethanol very greatly. Therefore, when esterifying this alcohol I customarily use it in this aqueous form, and allow a sufficient excess of sulfur trioxide to dehydrate the trinitroethanol in the sulfuric acid medium. When working on a commercial scale this technique greatly increases the convenience and safety of the operation. It should be realized, however, that this dehydration is exothermic, and that the mixture may need cooling and thorough stirring to avoid local overheating.

Where reference is made herein to "initial concentration" of sulfuric acid, I mean the concentration of the sulfuric acid in the reaction mixture immediately after the reaction mixture has been formed but before esterification; i.e., where either reagent contains water the initial concentration of the sulfuric acid is that after said water has reacted with sulfur trioxide and/or has diluted the sulfuric acid below 100%. This is illustrated in Table II of Examples 13 to 18.

It will be seen that I prefer to use sulfuric acid having a concentration above 100% and to use such an amount thereof as to provide sulfur trioxide in amount at least sufficient to react with all of the water present at any time in the reaction mixture, regardless of whether it is introduced with reagents or is formed by the esterification. This sulfur trioxide can be present initially in the sulfuric acid, or it can be added portionwise or continuously to the reaction mixture during the esterification in order to keep the sulfur trioxide concentration below that at which undesirable side reactions take place. When sulfur trioxide is added to the reaction mixture it is advisable to stir the mixture rapidly, and it may be necessary to cool it somewhat.

The ester can usually be removed from the reaction medium by filtration at room temperature or below. Alternately, when the product is a liquid or is too soluble in the medium to crystallize in good yield, I separate it by extraction with a suitable solvent such as chloroform or carbon tetrachloride, or by precipitation in ice water.

The sulfuric acid solution remaining after filtration or extraction of the product ester can be used to prepare a second batch of the same ester provided that the sulfuric acid concentration, with respect to sulfur trioxide, is high enough. Normally, I add sulfur trioxide to the mother liquor to adjust the concentration.

The alcohol and the carboxylic acid usually are charged into the sulfuric acid in equivalent amounts. When the organic acid contains more than one carboxyl group I can, of course, obtain more than one ester. In such a case I normally use an amount of the alcohol which is substantially equivalent to the equivalent number of carboxyl groups which I desire to esterify. When I wish to form the half ester of a dicarboxylic acid I sometimes use less than one equivalent of the alcohol in order to minimize formation of the di-ester. For the same reason I often add the alcohol gradually to the agitated mixture of the dicarboxylic acid and sulfuric acid.

While, as I have pointed out, only a very small amount of water can be present initially in the sulfuric acid, I can dilute the sulfuric acid with certain other miscible liquids without impairing to any extent its ability to function as an esterifying medium in my invention. For instance, when 100% sulfuric acid is diluted with an equal volume of nitromethane, esterification proceeds substantially as well as it does in the same amount of 100% sulfuric acid alone. Such a diluent is sometimes useful in increasing the solubility of one or both of the reagents in the sulfuric acid. The diluent also is often used as the medium in the preparation of an explosive reagent such as trinitroethanol. By keeping the reagent at all times in the solvent, explosion hazards are reduced. Nitromethane also acts as a heat regulator to keep the temperature of the mixture from rising much above 100° C. at atmospheric pressure.

My invention can be applied to the esterification of 2,2-dinitroethanol, 2,2,2-trinitroethanol or 2,2,-dinitropropanol with any carboxylic acid or equivalent derivative thereof, which is not decomposed rapidly by concentrated or fuming sulfuric acid or sulfur trioxide under the conditions of my process. Acids excluded thus are formic, malonic, and oxalic acids. The carboxylic acids which are operable are selected from the alkanoic acids having at least two carbon atoms, e.g., acetic, propionic, butyric, isobutyric, pentanoic, hexanoic, 2-ethylhexanoic, lauric, palmitic and stearic acids; the alkanedioic acids containing at least four carbon atoms, e.g., succinic, glutaric, adipic, pimelic, suberic, azelaic and sebacic acids; the arene mono- and di-carboxylic acids, e.g., benzoic, 1-naphthoic, 2-naphthoic, phthalic, isophthalic, terephthalic and naphthalene-dicarboxylic acids; halogenated alkansic acids having at least two carbon atoms, e.g., bromacetic, chloracetic, dichloracetic, trichloracetic, fluoracetic, trifluoroacetic and heptafluorobutyric acids; the nitroalkane carboxylic acids, e.g., 4,4,4-trinitrobutyric, 4,4,4-trinitro-2-methylbutyric; nitroarene carboxylic acids, e.g., 4-nitrophthalic and 2,4,6-trinitrobenzoic acids; and the alkenedioic acids, e.g., maleic, fumaric, and citraconic acids.

Acids which are decomposed rapidly by concentrated or fuming sulfuric acid under the conditions of my process are not operable in my invention. Such acids are formic acid, oxalic acid and malonic acid.

The amides having the grouping —$CONH_2$, esters of lower (up to $C_4$) unsubstituted alkanols, and anhydrides are substantially equivalent to the corresponding carboxylic acids in the operation of my invention. In fact, I sometimes prefer to use one of these alternate compounds. For example, in making an ester of 4,4,4-trinitrobutyric acid I often use this acid in the form of its methyl or ethyl ester because it is somewhat easier to obtain the said ester than it is to obtain the free acid. The reagent ester is conventionally made by reacting nitroform with methyl acrylate or ethyl acrylate, and the reagent acid is likewise made from nitroform and acrylic acid. Because the acrylic esters can be prepared and stabilized against polymerization during storage somewhat more easily than can acrylic acid itself, I find it convenient to work with the alkyl esters. For the same reason, I often prepare, and use in my new process, 4,4,4-trinitrobutyramide because acrylamide is sometimes more convenient to handle than acrylic acid.

The utility of a carboxylic acid or derivative thereof in the method of my invention can be readily determined by the following procedure:

A one gram sample of the compound under consideration is added to 10 grams of sulfuric acid of the strength to be used in the proposed esterification and warmed to the temperature at which the esterification is to be carried out, for a period of two hours. At the end of this time the mixture is poured onto ice. The organic material is separated by extraction with ether which is in turn removed by evaporation. The physical constants (e.g., melting point, boiling point, neutralization equivalent) of the residue are determined. If they are substantially the same as those of the starting compound and if the recovery is substantially quantitative the compound in question is shown to be operable in my invention. Compounds that undergo extensive sulfonation, polymerization, decarboxylation or hydrolysis under these conditions, as shown by failure to meet the foregoing test, are not suitable for esterification by the method of my invention. In the appended claims, by the term "stable with respect to the sulfuric acid" I mean those compounds which are shown to be operable by this test procedure.

The order in which the reagents are mixed with the sulfuric acid is somewhat critical. The best yields are obtained when the organic acid is added to the sulfuric acid, and the alcohol is added later. However, in a less preferred form of my invention, I can add the organic acid to a mixture of the alcohol and sulfuric acid.

The following examples illustrate the invention. All parts and percentages are by weight.

EXAMPLE 1

Dry 2,2,2-trinitroethanol (1.5 parts) was dissolved in a solution of 3.5 parts (excess) of benzoic acid in 36 parts of 100% sulfuric acid. This solution was left at room temperature for 16 hours under a layer of 15 parts of chloroform. At the end of this time the layers were separated, and the chloroform layer was evaporated. Crude 2,2,2-trinitroethyl benzoate (1.29 parts) was obtained. Further extraction of the sulfuric acid layer with chloroform gave additional ester (0.81 part). The ester fractions were combined and washed well with water to remove impurities. The yield of the said ester was 1.9 parts, or 83% of theory. The pale tan crystals melted at 74–75° C. Prior workers have reported the melting point of this ester as 76–77° C.

EXAMPLE 2

(A) To a solution of 4.46 parts of 4,4,4-trinitrobutyric acid in 20 parts of 108% sulfuric acid was added 3.98 parts (slight excess) of dry 2,2,2-trinitroethanol. The solution was heated for three hours at 65° C. Within the first ten minutes an oil began to separate from the solution. This oil crystallized on being seeded with 2,2,2-trinitroethyl 4,4,4-trinitrobutyrate. The mixture was then left for an hour at room temperature, and the white crystalline ester was filtered under nitrogen to give 93% yield of the said ester. An additional 5.6% yield was obtained on letting the filtrate stand for several hours to complete the crystallization. The combined precipitate was washed with water and recrystallized from aqueous methanol. The white ester melted at 92–93° C. Prior workers have reported the melting point of this ester as 92.5–93° C.

(B) A second preparation of the ester was carried out in the same way except that when the esterification was completed the cooled mixture was poured onto ice. The yield of rather impure ester was 97%. One recrystallization from methanol raised the melting point to the proper value.

EXAMPLES 3–11

The following examples show typical preparations of 2,2,2-trinitroethyl 4,4,4-trinitrobutyrate in sulfuric acid of various concentrations, at several temperatures and times. Aside from these variations, shown individually in Table I, each preparation was carried out as shown in Example 2A, which is shown again for comparison.

*Table I*

| Example | Initial Concn. of $H_2SO_4$ (percent) | Temp. (° C.) | Time (hrs.) | Yield (percent) |
|---|---|---|---|---|
| 3 | 96 | 27 | 20 | 15 |
| 4 | 96 | 75 | 3 | 51 |
| 5 | 96 | 100 | 3 | 1 74 |
| 6 | 100 | 27 | 20 | 67 |
| 7 | 108 | 27 | 20 | 91 |
| 8 | 108 | 27 | 90 | 94 |
| 9 | 108 | 50 | 5 | 97 |
| 2A | 108 | 65 | 3 | 98 |
| 10 | 120 | 27 | 66 | 80 |
| 11 | 130 | 27 | 20 | 31 |

[1] The ester was contaminated with decomposition products which presumably were formed from one or both of the reagents.

These examples show several important points: (1) Sulfuric acid ranging in initial concentration between 96% and 130% can be used. (2) Sulfuric acid of about 108% strength is close to the optimum for this reaction, when used in an amount such that there is nearly a sufficient amount of $SO_3$ present to react with all of the water formed in the esterification (the amount of sulfuric acid used in Examples 7–9 and 2A contains 1.5 parts of $SO_3$; theory calls for 1.6 parts). (3) The reaction time and temperature can be varied widely. (4) The esterification is substantially quantitative when optimum conditions are used.

EXAMPLE 12

2,2,2-trinitroethyl 4,4,4-trinitrobutyrate was made as shown in Example 6 except that the esterification was carried out in a mixture of equal volumes of 100% sulfuric acid and nitromethane, and the amount of sulfuric acid was three times that used therein. The yield was 73% of theory.

EXAMPLES 13–18

The following examples show typical preparations of 2,2,2-trinitroethyl 4,4,4-trinitrobutyrate from 2,2,2-trinitroethanol which was in the form of an oil containing 20% of water. Each preparation was carried out by dissolving 4.46 parts of 4,4,4-trinitrobutyric acid in 20 parts of sulfuric acid of the concentration shown in Table II. Then 4.5 parts of an oil consisting of about 80% 2,2,2-trinitroethanol and 20% water was added to the solution while stirring and chilling. Esterfication then took place under the conditions shown in Table II.

*Table II*

| Example | Concn. of $H_2SO_4$ Before Mixing (percent) | "Initial Concn. of $H_2SO_4$" (percent)a | Temp. (° C.) | Time (hrs.) | Yield (percent) |
|---|---|---|---|---|---|
| 13 | 120 | 99 | 32 | 90 | 88 |
| 14 | 120 | 99 | 50 | 5 | 82 |
| 15 | 120 | 99 | 75 | 2 | b, c 79 |
| 16 | 130 | 102 | 27 | 20 | 94 |
| 17 | 130 | 102 | 100 | 1 | b 62 |
| 18 | 130 | 102 | 100 | 1 | b, c 58 | a Defined on page 6, lines 4 to 15.
b Partial decomposition of the reagents occurred during first mixing.
c Solution was stirred during heating.

These examples show that wet reagents can be used in my invention provided that the amount of sulfur trioxide in the sulfuric acid is sufficient to react with almost all of the water introduced with one or both of the reagents.

EXAMPLE 19

2,2,2-trinitroethanol (2.7 parts) was added to a solution of 2,4,6-trinitrobenzoic acid (3.86 parts) in 27 parts of 130% sulfuric acid. The mixture was left at room temperature for 90 hours, during which time part of the product crystallized. The mixture was poured onto ice to complete the precipitation. The product was filtered, washed in cold dilute aqueous sodium bicarbonate, and then with water, and dried. The yield of 2,2,2-trinitroethyl 2,4,6-trinitrobenzoate was 2.0 parts, or 31.8% of theory.

EXAMPLE 20

2,2,2-trinitroethanol (2.0 parts—10% excess) was added to a solution of fumaric acid (0.58 part) in 9 parts of 110% sulfuric acid. The mixture was left at 35° C. for 16 hours, during which time the product crystallized in flake form. It was extracted with chloroform, the chloroform solution was washed successively with cold water, dilute aqueous sodium bicarbonate, dilute hydrochloric acid, and ice water. The chloroform solution was evaporated to dryness. The yield of crude bis-(2,2,2-trinitroethyl) fumarate was 1.05 parts, or 46% of theory. It melted at 148–150° C. The identity of the ester was established by a mixed melting point determination with a known sample of the ester. The mixed melting point was 150–151° C. The pure ester melts at 152° C., according to prior workers.

EXAMPLE 21

A mixture of freshly distilled methyl 4,4,4-trinitrobutyrate (4.7 parts), 2,2,2-trinitroethanol (4.0 parts) and 110% sulfuric acid (20 parts) was kept at 50° C. for 48 hours, during which time the solution gradually became filled with shining white crystals of the product. The mixture was cooled to room temperature, and the product was filtered, washed with water and dried. The yield of pure 2,2,2-trinitroethyl 4,4,4-trinitrobutyrate was 6.25 parts, or 81% of theory.

EXAMPLE 22

A mixture of 8 parts of ethyl bromoacetate, 8 parts of 2,2,2-trinitroethanol and 40 parts of 108% sulfuric acid was kept at 50° C. for 72 hours, and then was poured onto ice. The aqueous mixture was extracted with chloroform. This extract was dried and distilled. The 2,2,2-trinitroethyl bromoacetate was isolated as a colorless liquid in 44% yield (5.95 parts). Boiling point 86–88° C. at 0.25 mm. Hg; $n_D^{20}$ 1.4875.

Analysis. Calcd. for $C_4H_4N_3$ Br 08: carbon 15.9%; hydrogen 1.32%. Found: carbon 15.43%, hydrogen 1.56%.

EXAMPLE 23

A mixture of 3.6 parts of 2,2,2-trinitroethanol, 1.0 parts of succinic anhydride and 10 parts of 108% sulfuric acid was kept at room temperature for 64 hours, during which time the product crystallized. This was filtered and recrystallized from aqueous methanol. The bis-(2,2,2-trinitroethyl) succinate was obtained in 34% yield (1.56 parts). It melted at 126–127° C. Prior workers report the melting point as 124° C.

EXAMPLE 24

A mixture of 1.81 parts of 2,2,2-trinitroethanol, 1.14 parts of trifluoroacetic acid and 10 parts of 110% sulfuric acid was kept at 45–50° C. for 18 hours. The solution was then extracted with chloroform, and the extract was distilled. The 2,2,2-trinitroethyl trifluoroacetate was obtained as a colorless liquid in 16% yield (0.47 parts). Boiling point 67° C. at 10 mm., 47° C. at 2 mm. Hg: $n_D^{20}$ 1.4292.

EXAMPLE 25

The process of Example 24 was repeated except that heptafluorobutyric acid (2.14 parts) was used instead of the trifluoroacetic acid. The 2,2,2-trinitroethyl heptafluoroacetate was obtained as a colorless liquid in 25% yield (0.99 parts). Boiling point 56° C. at 2 mm., 40° C. at 0.5 mm.; melting point 39° C.

The 2,2,2-trinitroethyl esters described in Examples 21, 24 and 25 burn quietly and smoothly with a white flame. They are useful as propellants and propellant plasticizers.

EXAMPLE 26

A mixture (4.8 parts) consisting of approximately equal weights of 4,4,4-trinitrobutyric acid and 4,4,4-trinitrobutyramide was mixed with 3.6 parts of 2,2,2-trinitroethanol in 80 parts of 100% sulfuric acid and kept for 18 hours at room temperature. The mixture was then extracted with chloroform, and the extract was evaporated to small volume. The 2,2,2-trinitroethyl 4,4,4-trinitrobutyrate was obtained in 62% yield (5.0 parts).

Other esters which can be made by the process of this invention are:

2,2,2-trinitroethyl acetate,
2,2,2-trinitroethyl propionate,
2,2,2-trinitroethyl butyrate,
2,2,2,-trinitroethyl isobutyrate,
2,2,2-trinitroethyl hexanoate,
2,2,2-trinitroethyl 2-ethylhexanoate,
2,2,2-trinitroethyl laurate,
2,2,2-trinitroethyl palmitate,
2,2,2-trinitroethyl stearate,
2,2,2-trinitroethyl acid succinate,
2,2,2-trinitroethyl acid adipate,
bis-(2,2,2-trinitroethyl) adipate,
2,2,2-trinitroethyl acid maleate,
bis-(2,2,2-trinitroethyl) maleate,
2,2,2-trinitroethyl acid fumarate,
2,2,2-trinitroethyl acid phthalate,
bis-(2,2,2-trinitroethyl) phthalate,
2,2,2-trinitroethyl chloroacetate,
2,2,2-trinitroethyl trichloracetate,
2,2,2-trinitroethyl fluoracetate,
2,2,2-trinitroethyl 4,4,4-trinitro-2-methylbutyrate,
2,2-dinitroethyl acetate,
2,2-dinitroethyl butyrate,
2,2-dinitroethyl laurate,
2,2-dinitroethyl acid glutarate,
bis-(2,2-dinitroethyl) glutarate,
2,2-dinitroethyl acid suberate,
bis-(2,2-dinitroethyl) suberate,
2,2-dinitroethyl acid isophthalate,
bis-(2,2-dinitroethyl) isophthalate,
2,2-dinitroethyl acid 4-nitro-phthalate,
bis-(2,2-dinitroethyl)-4-nitrophthalate,
2,2-dinitroethyl dichloracetate,
2,2-dinitroethyl trifluoracetate,
2,2-dinitroethyl 4,4,4-trinitrobutyrate,
2,2-dinitroethyl 2,4,6-trinitrobenzoate,
2,2-dinitroethyl acid fumarate,
bis-(2,2-dinitroethyl) fumarate,
2,2-dinitropropyl acetate,
2,2-dinitropropyl pentanoate,
2,2-dinitropropyl palmitate,
2,2-dinitropropyl acid fumarate,
bis-(2,2-dinitropropyl) fumarate,
2,2-dinitropropyl acide itaconate,
bis-(2,2-dinitropropyl) itaconate,
2,2-dinitropropyl acid citraconate,
bis-(2,2-dinitropropyl) citraconate,
2,2-dinitropropyl acid terephthalate,
bis-(2,2-dinitropropyl) terephthalate,
2,2-dinitropropyl acid naphthalate,
bis-(2,2-dinitropropyl) naphthalate,
2,2-dinitropropyl 4,4,4-trinitrobutyrate,
2,2-dinitropropyl 4,4,4-trinitro-2-methylbutyrate and
2,2-dinitropropyl 2,4,6-trinitrobenzoate.

I claim:
1. The method of making an ester of a carboxylic acid and an alcohol having the structure

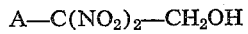

$$A—C(NO_2)_2—CH_2OH$$

where A is selected from the group consisting of hydrogen, methyl and nitro, which comprises forming said ester at a temperature of from room temperature to 100° C. in a reaction mixture comprising (1) a carboxylic reagent selected from the group consisting of carboxylic acids, lower alkyl esters thereof, amides thereof having the grouping —CONH$_2$, and anhydrides thereof, said carboxylic acids being selected from the group consisting of alkanoic acids having at least two carbon atoms, alkanedioic acids containing at least four carbon atoms, arene mono- and di-carboxylic acids, halogenated alkanoic acids having at least two carbon atoms, nitroalkane carboxylic acids, nitroarene carboxylic acids, and alkene dioic acids, (2) an alcohol having the above structure and (3) a reaction medium comprising sulfuric acid having an initial concentration of from about 96% to 130% and being sufficient in amount to dissolve a major proportion of said reagents, and separating said product ester from the resulting reaction mixture.

2. The method of claim 1 wherein the temperature is between 40° C. and 75° C.

3. The method of claim 1 wherein the concentration of said sulfuric acid is above 100% and wherein the amount thereof is such as to provide an amount of sulfur trioxide at least sufficient to react with all of the water present at any time in the mixture.

4. The method of claim 1 wherein said alcohol is 2,2,2-trinitroethanol.

5. The method of claim 3 wherein said alcohol is 2,2,2-trinitroethanol containing water as an impurity.

6. The method of claim 1 wherein said carboxylic reagent is 4,4,4-trinitrobutyric acid and said alcohol is 2,2,2-trinitroethanol.

7. The method of claim 1 wherein said carboxylic reagent is fumaric acid and said alcoholic reagent is 2,2,2-trinitroethanol.

8. The method of claim 1 wherein said carboxylic reagent is 2,4,6-trintrobenzoic acid and said alcohol is 2,2,2-trinitroethanol.

9. The method of claim 1 wherein said carboxylic reagent is methyl 4,4,4-trinitrobutyrate and said alcohol is 2,2,2-trinitroethanol.

10. The method of claim 1 wherein said carboxylic reagent is 4,4,4-trinitrobutyramide and said alcohol is 2,2,2-trinitroethanol.

11. The method of claim 1 wherein the product ester is separated by crystallization from the reaction mixture.

12. The method of claim 1 wherein the product ester is separated by extraction of the reaction mixture with a solvent selected from the group consisting of chloroform and carbon tetrachloride.

13. The method of claim 1 wherein the product ester is separated by commingling the reaction mixture with ice, thereby precipitating the solid ester.

References Cited by the Examiner
UNITED STATES PATENTS

| 2,365,717 | 12/44 | Mighton | 260—485 X |
| 2,425,144 | 8/47 | Bruson et al. | 260—485 |

OTHER REFERENCES

Unit Processes in Organic Synthesis by P. H. Groggins, 3rd Edition 1947, McGraw-Hill Book Co., New York, pages 624, 625, 629, 649–656.

LEON ZITVER, *Primary Examiner.*

WILLIAM G. WILES, *Examiner.*